United States Patent [19]
Werts

[11] Patent Number: 6,009,795
[45] Date of Patent: Jan. 4, 2000

[54] MOTORIZED ASSIST DEVICE FOR RAISING AND LOWERING FRYER LID

[75] Inventor: Stephen D. Werts, Eaton, Ohio

[73] Assignee: Henny Penny Corporation, Eaton, Ohio

[21] Appl. No.: 09/070,760

[22] Filed: May 1, 1998

[51] Int. Cl.[7] .................................................. A47J 37/12
[52] U.S. Cl. ............................. 99/336; 99/407; 220/314; 220/318
[58] Field of Search ............................. 99/330, 336, 403, 99/407, 409, 410–417; 126/369, 391; 210/167, DIG. 8; 212/152; 220/315–318, 363, 329, 364; 292/257, 259

[56] References Cited

U.S. PATENT DOCUMENTS

| | | |
|---|---|---|
| D. 336,007 | 6/1993 | King et al. . |
| 1,506,113 | 8/1924 | Dearing ...................................... 99/336 |
| 1,551,869 | 9/1925 | Dearing ...................................... 99/336 |
| 2,875,682 | 3/1959 | Smoot et al. . |
| 3,187,664 | 6/1965 | Jennings ................................ 99/407 X |
| 3,242,849 | 3/1966 | Wells . |
| 3,273,488 | 9/1966 | Anetsberger . |
| 3,501,316 | 3/1970 | Guthrie, Sr. . |
| 3,563,158 | 2/1971 | Omer ..................................... 99/330 X |
| 3,608,473 | 9/1971 | Kearn et al. . |
| 3,690,246 | 9/1972 | Guthrie, Sr. ........................... 99/410 X |
| 3,701,313 | 10/1972 | Boggs . |
| 3,821,925 | 7/1974 | Moore ................................... 99/407 X |
| 3,958,503 | 5/1976 | Moore . |
| 4,287,818 | 9/1981 | Moore et al. .......................... 99/416 X |
| 4,325,491 | 4/1982 | Barnhill ............................... 220/314 X |
| 4,437,159 | 3/1984 | Waugh . |
| 4,508,026 | 4/1985 | Anetsberger et al. . |
| 4,663,710 | 5/1987 | Waugh et al. . |
| 4,721,094 | 1/1988 | Nett . |
| 4,742,455 | 5/1988 | Schreyer . |
| 4,848,318 | 7/1989 | Brewer . |
| 4,930,408 | 6/1990 | King et al. .................................. 99/407 |
| 4,997,101 | 3/1991 | King et al. .............................. 220/318 |
| 5,033,368 | 7/1991 | Brewer . |
| 5,402,712 | 4/1995 | King et al. .................................. 99/407 |

*Primary Examiner*—Timothy F. Simone
*Attorney, Agent, or Firm*—Baker & Botts, LLP

[57] ABSTRACT

A motorized assist device for raising and lowering a lifting lid, includes a supporting brace for mounting the lifting lid. The supporting bracket has a central bracing member, and a monorail mounting bracket positioned on the central bracing member. A monorail has a receiving bracket for receiving the monorail mounting bracket. An I-beam framework is positioned within the monorail and has a pair of U-shaped guides. A carriage has a pair of wheels and is mounted on the framework, such that each of the U-shaped guides receives one of the pair of the wheels. The carriage is secured to the receiving bracket. A counterweight assembly is used for raising and lowering the carriage along the monorail. The counterweight assembly includes a pulley mounted at a top portion of the framework, a counterweight movably mounted within in a pair of counterweight guides, and primary and secondary counterweight cables, the first ends of which are attached to the counterweight and the second ends of which are attached to the carriage. These counterweight cables are threaded through the pulley. An assist motor is mounted on a motor support bracket positioned above the counterweight and below the pulley. The motor includes a cable drum driven by the motor and a lifting cable, a drum end of which is attached to the cable drum and a carriage end of which is attached to the carriage. The motor is operable in opposite directions to wind and unwind the lifting cable on the cable drum to lower and raise the carriage, respectively.

11 Claims, 12 Drawing Sheets

MOTORIZED ASSIST DEVICE FOR RAISING AND LOWERING FRYER LID

BACKGROUND OF THE INVENTION

1. Field of the Invention

The invention relates generally to a motorized assist device for raising and lowering the lid of a cooking vessel, such as a cooking vessel on a fryer. In particular, the present invention is directed to a motor assist device including a lifting lid mounted on a supporting brace and a monorail lifting device including a monorail having a receiving bracket for receiving a monorail mounting bracket positioned on the supporting bracket and automatic or manually assisted means for raising and lowering the lifting lid along the monorail.

2. Description of Related Art

A large capacity cooking apparatus or deep fat fryer may comprise a vat or cooking vessel of a sufficient size to receive a wire basket or tray carrier, in which a food product to be cooked is held. The basket or tray carrier is submersed in a cooking medium, such as melted shortening or cooking oil, which is contained in the cooking vessel. The cooking vessel may be closed by a lid which makes a seal with an upper edge of the cooking vessel. Alternatively, a large capacity cooking apparatus may be of an open-well design. In such open-well cooking apparatus, the lid of the cooking apparatus may be an open frame permitting direct access to the cooking vessel and to the food products submersed therein. The frame may support a wire basket for holding food products or a food tray carrier for carrying a plurality of trays containing food products. Although the frame may not form an air-tight seal with the upper edge of the cooking vessel, the frame may reduce spillage and splashing of a cooking medium from the cooking vessel during cooking.

Various types of automatic mechanisms exist for opening and closing the cooking vessel lids. Vertically shiftable rod means for raising and lowering the lid are described in U.S. Pat. No. 3,187,664. U.S. Pat. No. 3,608,472 describes raising and lowering the lid through the use of jack screws or the like. U.S. Pat. No. 3,821,925 describes the use of a geared bar or rack-like system for raising and lowering the lid. U.S. Pat. No. 3,563,158 describes hydraulic cylinders used to raise and lower the vessel lid. In some instances, known mechanisms also may be used to hold the lid down and in place, for example, during the pressurized operation of the cooking apparatus.

U.S. Pat. No. 4,930,408 describes a lid provided with a substantial locking mechanism to maintain the lid in its seated, closed position during that part of the cooking cycle in which the cooking vessel is pressurized. The lid is raised and lowered manually, but is provided with a counterbalance system, so that the operator need not contend with the full weight of the lid. Nevertheless, this system still requires some strength on the part of the operator and is more difficult for the smaller or less strong operator to handle.

In a known configuration, the lid lifting assembly includes a support frame vertically oriented and secured to a rearward end of a pressure cooking apparatus. This configuration is described in U.S. Pat. No. 5,402,712, the disclosure of which is incorporated herein by reference. A support frame includes a pair of vertical guide rails, each having a U-shaped cross-section and opening toward each other. The guide rails are joined together at their upper and lower ends by top and bottom horizontal frame members. The front, rear, sides, and top of the support frame may be enclosed by stainless steel panels forming a lid lifting device housing, which comprises a portion of a cooking apparatus cabinet or a cooking apparatus transfer cart. A carriage is mounted vertically within the support frame. The carriage has wheels or rollers which are adapted to be received within the support frame guide rails. Consequently, the carriage may be positioned vertically within the support frame. A pair of horizontal arms is affixed to the carriage. The arms extend from the carriage toward the cooking vessel lid through vertical slots in the stainless steel panel covering the front of the support frame. The cooking vessel lid of the pressure cooking apparatus is mounted on these horizontal arms.

A cable drum is driven by an electric motor mounted on the top horizontal frame member. In a further known configuration, a pair of cables is provided, each cable having one end attached to the drum and the other end attached to the carriage. One of the cables may be slightly longer than the other and, consequently, does not bear the weight of the carriage. The longer cable serves as a back-up cable if the primary cable fails. The drum is rotatable in a first direction by the electric motor to raise the carriage within the support frame and, consequently, raising the carriage arms and the lid therewith. The drum is rotatable in the opposite direction by the electric motor to lower the carriage within the support frame and to lower the arms and lid therewith. In this manner, the lid of the pressure cooking apparatus may be shifted between its lowered position seated upon the upper edge of the cooking vessel and its raised position.

In another known configuration, the cooking vessel lid may be manually raised and lowered with the assistance of a counterbalance weight supported in the lid lifting device housing. With the assistance of a locking device, the cooking apparatus lid may be manually lifted and supported at various heights. Moreover, the use of a counterbalance weight has been combined with the use of an electrical motor to create a manually assisted raising and lowering means.

In a pressure cooking apparatus, the food product is cooked for the desired length of time under both elevated heat and pressure. Following the cooking cycle, an operator may relieve the pressure in the cooking vessel and then may open the lid in order to remove the wire basket or tray carrier or simply remove the food product from the wire basket or from the trays on the tray carrier. Because such lids must be of sufficiently heavy construction to withstand the pressure within the cooking vessel during the cooking cycle, it may be difficult for some operators to lift the lid to load or unload the cooking apparatus, or remove the wire basket or fryer tray carrier. To overcome this problem, operators have employed various types of automatic mechanisms for opening and closing the cooking apparatus lid. In some instances, these various mechanisms are used to additionally hold the lid down and in a sealed position during the pressurized operation of the cooking apparatus.

Some known lid raising and lowering mechanisms require powerful power train means. Moreover, some of these mechanisms are positioned at the sides of or around the cooking vessel making access to the cooking vessel for loading and unloading and for cleaning difficult or awkward, or both. In addition, some of the raising and lowering means are sufficiently complex to require a skilled operator. Moreover, the more complex and the more exposed the raising and lowering mechanism, the more susceptible the mechanism is to the adverse effects of dust, dirt, and cooking medium residue.

SUMMARY OF THE INVENTION

Thus, a need has arisen for a motorized assist device that is simple in construction and operation and inexpensive to manufacture. It is an advantage of motorized assist device of the present invention that it allows use of an uncomplicated and compact structure of a monorail lifting device. It is a feature of the stream-lined monorail structure that it is easy to clean and easy to work around when loading unloading and cleaning the lifting lid. In addition, it is a feature of the motorized assist device that it is located behind the cooking apparatus vessel in the rear portion of the cooking apparatus housing. It is an advantage of the motorized assist device that it's positioning does not interfere with access to the cooking vessel for maintenance to or cleaning of the vessel or the lifting lid, or both. Further, a lock out configuration for the actuating the motorized assist device may be employed to reduce the likelihood of inadvertent raising (or lowering) of the vessel lid.

In an embodiment of the invention, a motorized assist device for raising and lowering a lifting lid, comprises a supporting brace for mounting the lifting lid, including a central bracing member, a monorail mounting bracket positioned on the central bracing member; a monorail having a receiving bracket for receiving the monorail mounting bracket; an I-beam framework positioned within the monorail and having a pair of U-shaped guides; and a carriage having at least a pair of wheels or rollers and mounted on the framework, such that each of the U-shaped guides receives at least one of the wheels or rollers, and to which the receiving bracket is secured. The motorized assisted device further includes a counterweight assembly for raising and lowering the carriage along the monorail, which has a pulley mounted at a top portion of the framework, a counterweight movably mounted within in a pair of counterweight guides, and at least one counterweight cable, a first end of which is attached to the counterweight and a second end of which is attached to the carriage and which is threaded through the pulley. The counterweight assembly may include a primary and a secondary counterweight cable, such that the primary counterweight cable is shorter than the secondary counterweight cable and the primary counterweight cable bears the weight of the counterweight. An assist motor is mounted on a motor support bracket positioned above the counterweight and below the pulley, including a cable drum driven by the motor and a lifting cable, a drum end of which is attached to the cable drum and a counterweight end of which is attached to the counterweight, such that the motor is operable in opposite directions to wind and unwind the lifting cable on the cable drum to raise and lower the counterweight, respectively.

In another embodiment of the invention, the motorized assist device further comprising a control device including a timer and a pair of control switches. The motor is activated to wind the lifting cable and thereby lower the lifting lid when the pair of control switches are depressed simultaneously for a predetermined period, e.g., about 10 seconds, measured by the timer. The control device may further includes a lifting lid position sensor, e.g., a pressure sensor or a photoelectric cell; a processor, e.g., a microprocessor; means for providing information to the processor, e.g., a keyboard or a series of push buttons; and a data storage means, such as an electromagnetic memory storage device or chip, for storing cooking times for a plurality of food products. When a product identity is provided to the processor, the processor retrieves a cooking time for the product and activates the timer. When the lifting lid position sensor indicates that the lifting lid is down and when the timer determines that the cooking time is complete, the processor activates the motor to unwind the lifting cable and thereby raise the lifting lid.

Other objects, features, and advantages will be apparent to persons of ordinary skill in the art in view of the following detailed description of preferred embodiments and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings in which:

FIG. 8d is a cutaway, rear view of the fryer transfer cart of FIG. 8a;

FIG. 8e is a partial cross-sectional view of the fryer transfer cart of FIG. 8a;

FIG. 11 is a frontal view of the fryer transfer cart of FIG. 8a.

DETAILED DESCRIPTION OF PREFERRED EMBODIMENTS

Preferred embodiments of the present invention and their advantages may be understood by referring to FIGS. 1–11, like numerals being used for like corresponding parts in the various drawings.

Figure 1:
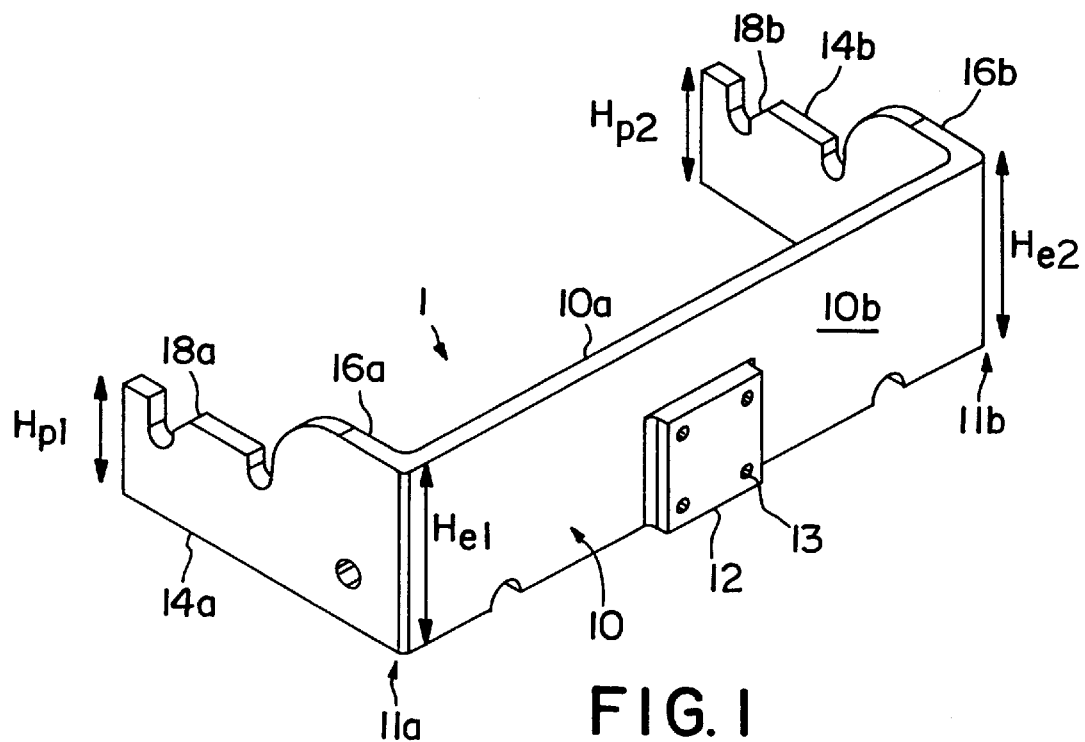
FIG. 1 is a perspective view of a supporting brace for pivotally mounting a fryer lifting lid on a monorail lifting device.
Figure 4:
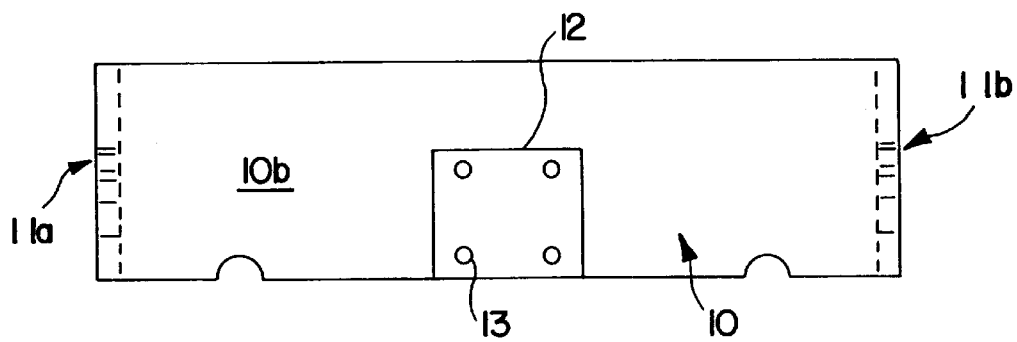
FIG. 4 is a rear view of a supporting brace of FIG. 1.

Referring to FIG. 1, a perspective view of a supporting brace 1 is depicted. Supporting brace 1 comprises a central bracing member 10 having a first member face 10a and a second member face 10b and a first member end 11a and a second member end 11b. Referring to FIGS. 1 and 4, a monorail mounting bracket 12 is positioned on second member face 10b and is equipped with a plurality of monorail mounting connector apertures 13. Apertures 13 may receive connector means (not shown), such as screws, bolts, and the like, to connect supporting brace 1 to a U-shaped receiving bracket (not shown) having a corresponding number of bracket apertures (not shown).

Figure 3:
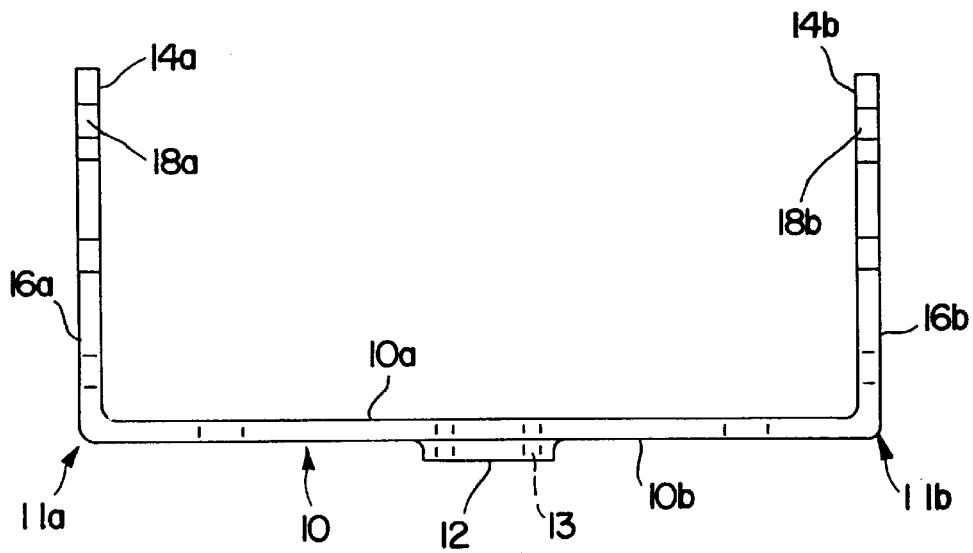
FIG. 3 is an overhead view of the supporting brace of FIG. 1.

Referring to FIGS. 1 and 3, a first pivot arm 14a and a second pivot arm 14b extend from first member end 11a and second member end 11b, respectively, and are substantially perpendicular to first member face 10a of central bracing member 10. First member end 11a has a first member end height $H_{e1}$, and second member end 11b has a member end height $H_{e2}$. First pivot arm 14a has a first pivot art height $H_{p1}$, and second pivot arm 14b has a second pivot arm height $H_{p2}$. First member end height $H_{e1}$ is greater than first pivot arm height $H_{p1}$, e.g., first pivot arm height $H_{p1}$ is about 60% of first member end height $H_{e1}$. Second member end height $H_{e2}$ is greater than second pivot arm height $H_{p2}$, e.g., second pivot arm height $H_{p2}$ is about 60% of second member end height $H_{e2}$. For example, $H_{p1}$, and $H_{p2}$ may each be about three (3) inches (7.62 cm), and $H_{e1}$ and $H_{e2}$ may each be about five (5) inches (12.7 cm).

Figure 2:
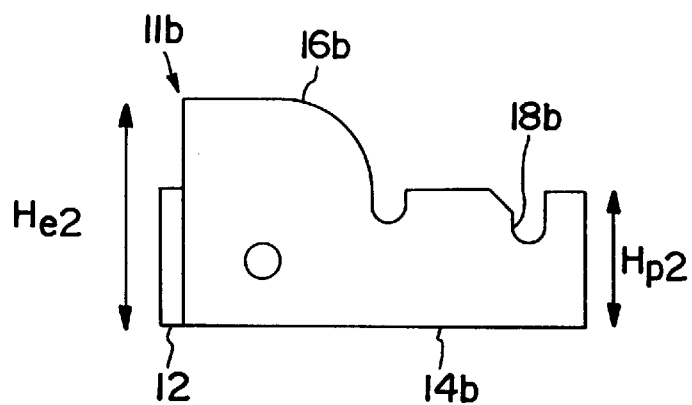
FIG. 2 is a side view of the supporting brace of FIG. 1.

Referring to FIG. 2, a second reinforcing arm 16b extends from second member end 11b of central bracing member 10 and extends along and contacts second pivot arm 14b for at least a portion of its length, e.g., less than about one half of its length. Similarly, a first reinforcing arm 16a extends from first member end 11a of central bracing member 10 and extends along and contacts first pivot arm 14a for at least a portion of its length. Supporting brace 1 may be manufactured from metal, ceramic, composite, or other similarly strong and rigid material. Preferably, supporting brace 1 is made from an aluminum alloy, such as an aluminum alloy with an Aluminum Association Designation No. 356. Further, it is preferred that the aluminum alloy has a temper designation of about T6.

Figure 5:
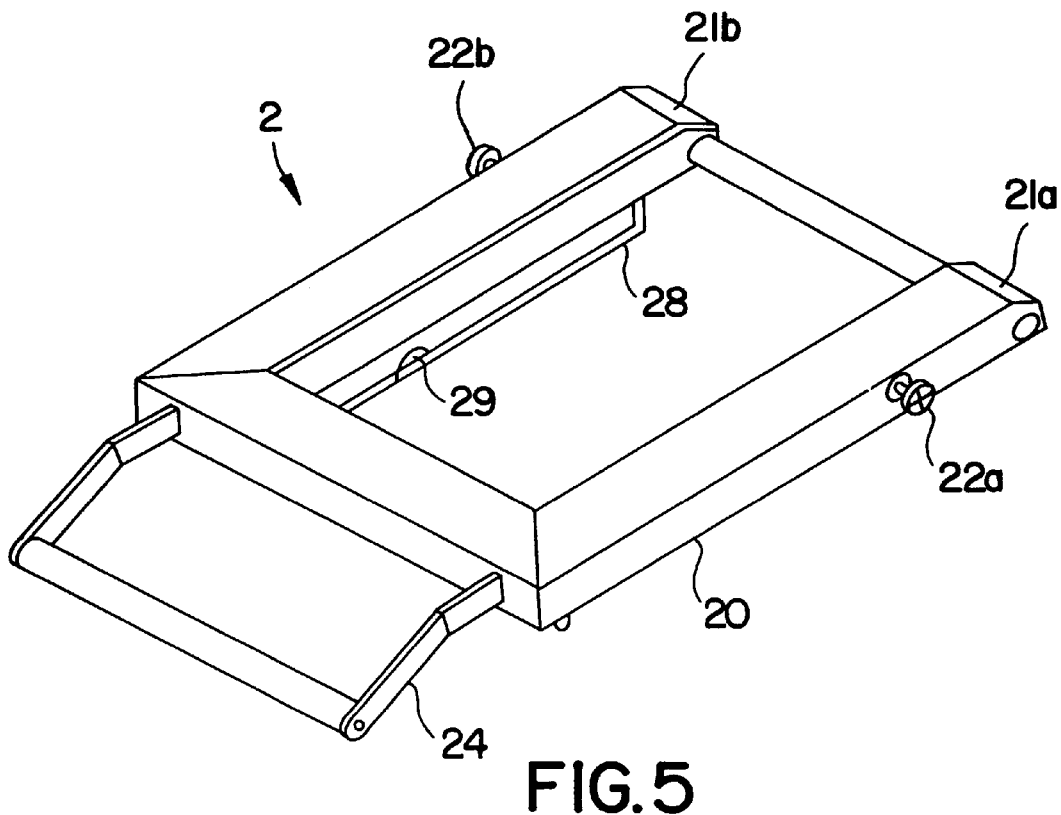
FIG. 5 is a perspective view of a lifting lid for an open-well fryer.
Figure 6:
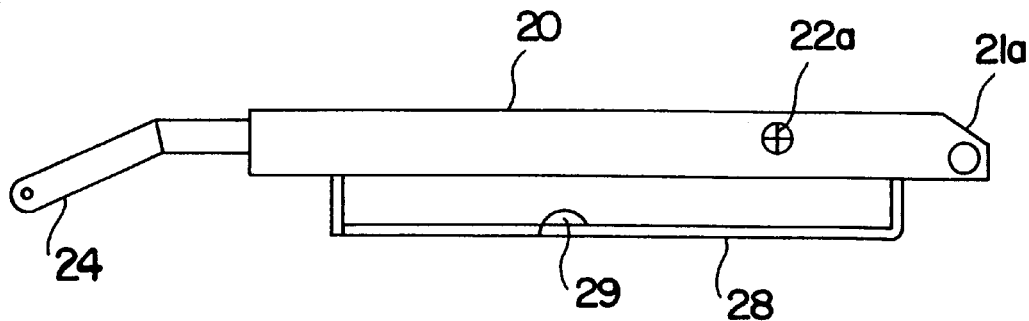
FIG. 6 is a side view of the lifting lid of FIG. 5.

Referring to FIGS. 5 and 6, a lifting lid 2 for an open well cooking apparatus is depicted. Lifting lid 2 comprises a substantially rectangular frame 20. Frame 20 has a first frame pivot cutout 21a and a second frame pivot cutout 21b, which are formed on a portion of frame 20 adjacent to supporting brace 1 in locations that generally correspond in proximity to first member end 11a and second member end 11b, respectively. Frame 20 also has a pair of pivot rods 22a and 22b, which are adapted to be received by a first lid pivot bracket 18a and a second lid pivot bracket 18b, respectively, as depicted in FIG. 1. Frame 20 further comprises a handle 24, by which an operator may manually raise or lower or may assist a motor in raising or lowering lifting lid 2 and by which lifting lid 2 may be pivoted on pivot rods 22a and 22b for inspection, cleaning, or maintenance.

Figure 7:
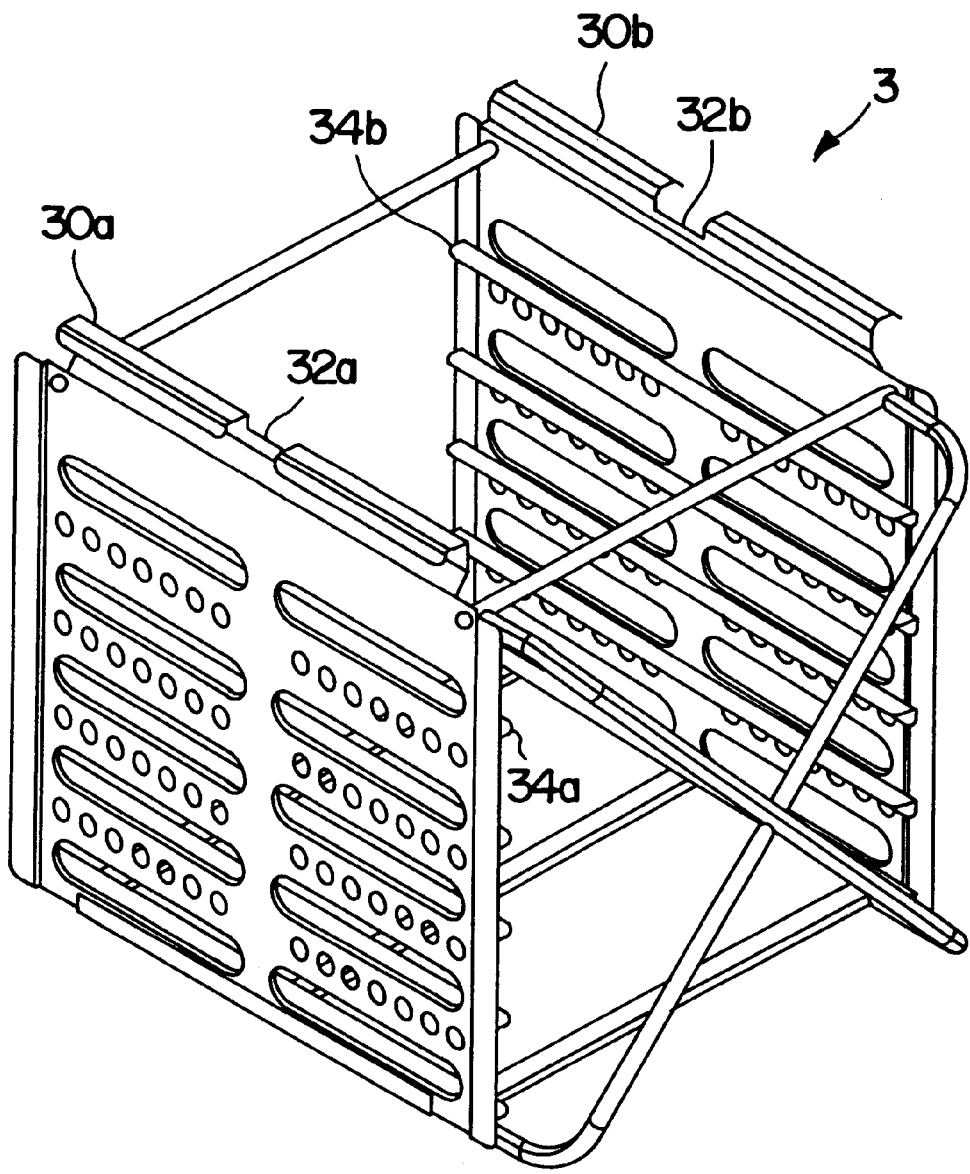
FIG. 7 is a perspective view of a food carrier apparatus, which may be suspended beneath a lifting lid.

Lifting lid 2 further comprises a removably mounted food carrier apparatus, such as that depicted in FIG. 7, which is suspended beneath lifting lid 2. The food carrier apparatus may be: a wire basket, such as those used to cook french fries in many restaurants; a tray carrier having a plurality of slots, each for receiving a food product carrier trays; or the like. Food product carrier trays may be wire baskets or may be fabricated from sheet metal and may include a plurality of openings which permit a cooking medium to flow through the tray. Frame 20 includes a pair of supporting rails 28. Supporting rails 28 are parallel to each other and extend longitudinally beneath frame 20. Moreover, rails 28 are oriented substantially perpendicular to first member face 10a of central bracing member 10.

Referring to FIG. 7, a food carrier apparatus 3 is depicted which has a pair of opposing carrier tray arms 30a and 30b. Carrier tray arms 30a and 30b are adapted to engage supporting rails 28 which extend beneath frame 20. Referring to FIGS. 5 and 6, a food carrier apparatus stop 29 is formed on each of supporting rail 28. Food carrier apparatus stop 29 is adapted to secure food carrier apparatus 3 on rails 28 of lifting lid 2. A carrier stop receiving gap 32a is formed in carrier tray arm 30a, and a carrier stop receiving gap 32b is formed in carrier tray arm 30b, to receive one of food carrier apparatus stops 29 from rails 28.

Referring again to FIG. 7, food carrier apparatus 3 has a plurality of pairs of food tray support brackets 34a and 34b. Food tray support brackets 34a and 34b are adapted to receive a plurality of food product carriers. As noted above, these food product carriers may be wire baskets or tray carriers for carrying sheet metal trays and including a plurality of openings which permit a cooking medium to flow between such trays, or the like.

Figure 8A:
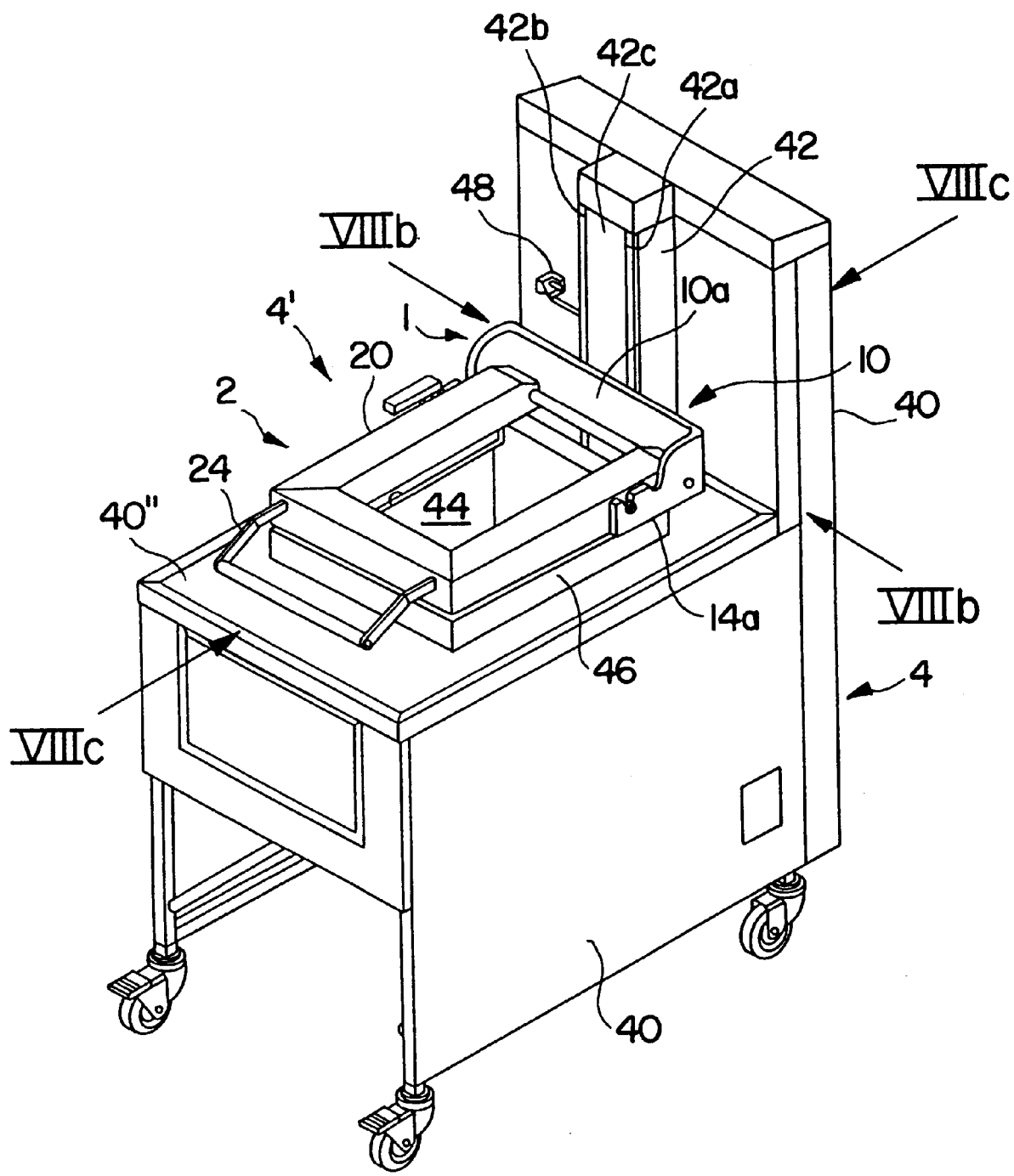
FIG. 8a is a perspective view of a fryer transfer cart with the lifting lid of FIG. 5 mounted on a monorail by means of the supporting brace of FIG. 1.
Figure 9:
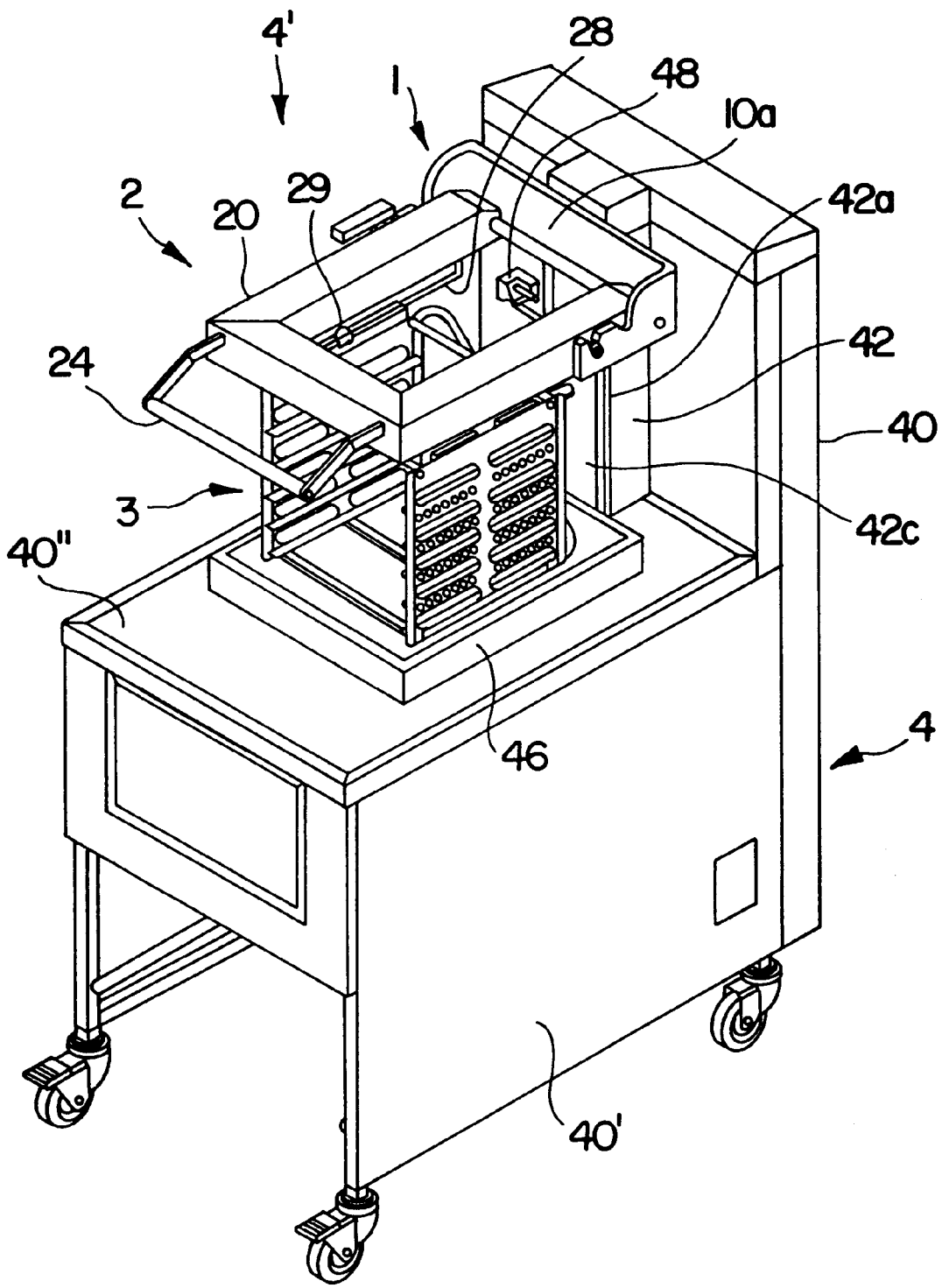
FIG. 9 is a perspective view of the fryer transfer cart of FIG. 8a showing the lifting lid in the raised position with the food carrier apparatus of FIG. 7 suspended beneath the lifting lid.

Referring first to FIGS. 8a and 9, fryer transfer cart 4 of the large capacity, cooking apparatus comprises a generally rectangular housing 40' having an upper surface 40" at essentially table-top height. Housing 40' encloses substantially rectangular cooking vessel 44. Upper end 46 of vessel 44 terminates in an open top which projects upwardly above upper surface 40". A control module (not shown) located in the front wall of housing 40' for controlling the various functions of the pressure cooking apparatus.

Figure 8B:
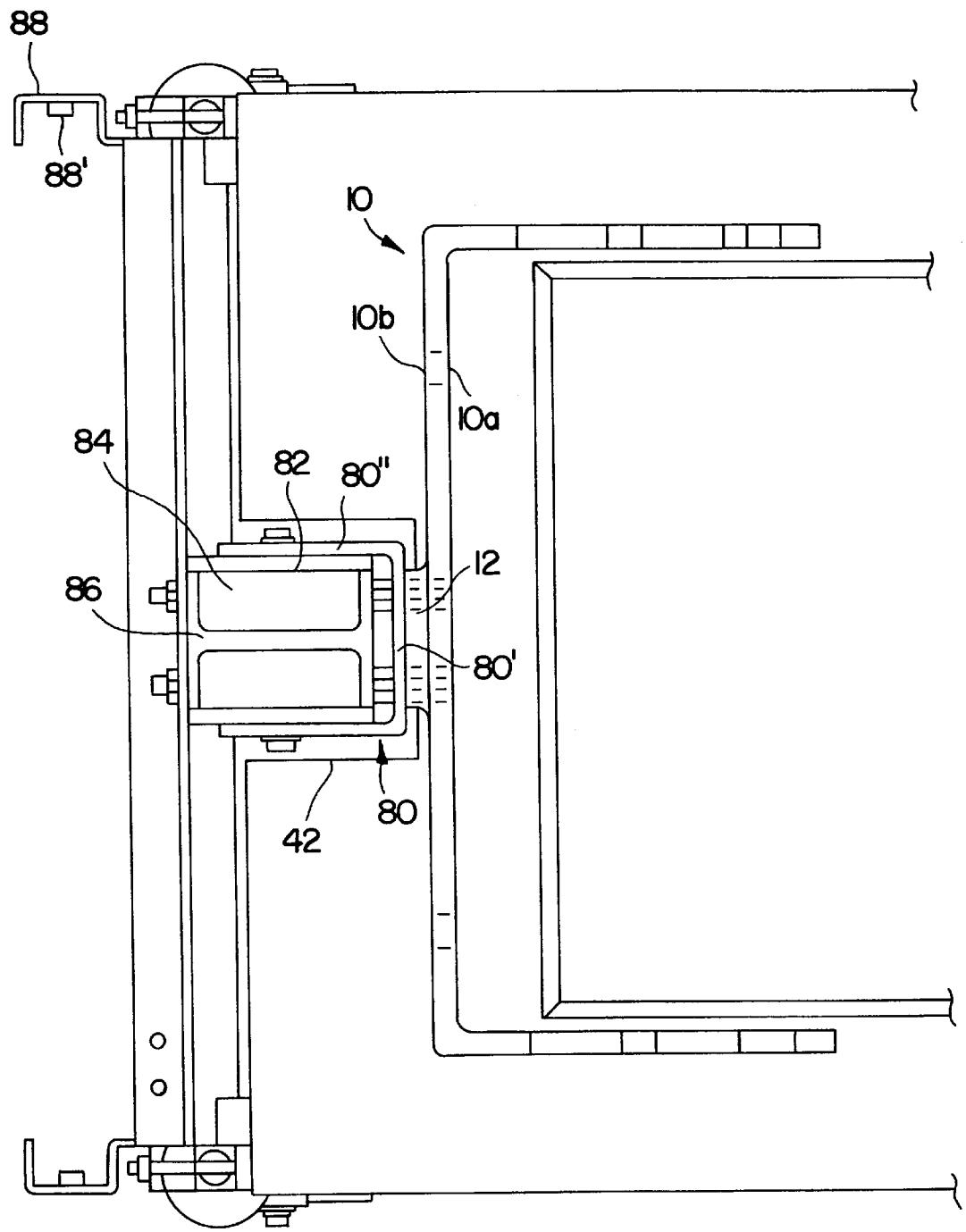
FIG. 8b is an enlarged, partial cross-sectional view of the fryer transfer cart of FIG. 8a along Line VIIIb—VIIIb.

Referring to FIG. 8a, a fryer transfer cart 4 includes a monorail lifting device housing 40. Lifting lid 2 of FIG. 5 is pivotally mounted on supporting brace 1 of FIG. 1. Lifting lid 2 and supporting brace 1 are mounted by means of a U-shaped receiving bracket (not shown) on a monorail 42 which extends from monorail lifting device housing 40. Monorail 42 includes a first monorail wear strip 42a and a second monorail wear strip 42b. Wear strips 42a and 42b may be fabricated from plastics, ceramics, Teflon® coated metal, or the like and prevent damage to monorail 42 and supporting brace 1 due to abrasion between supporting brace 1 and monorail 42. Referring to FIG. 8b, an enlarged, partial cross-sectional view of fryer transfer cart 4 of FIG. 8a is depicted along Line VIIIb—VIIIb. Monorail 42 has a central opening 42c in which a U-shaped receiving bracket 80 may be inserted. U-shaped receiving bracket 80 moves within central opening 42c as lifting lid 2 and supporting brace 1 are raised and lowered. Further, sheets of plastic or metal may be slidably mounted within central opening 42c, above and below the receiving bracket, such that central opening 42c may remain sealed despite the movement of lifting lid 2 and supporting brace 1. These protective sheets prevent dust, dirt, and cooking medium residue from interfering with the raising and lowering of lifting lid 2 and supporting brace 1.

Referring again to FIG. 8b, a central portion 80' of the receiving bracket 80 is secured to monorail mounting bracket 12 of FIG. 1, such that two, substantially parallel guide arms 80" of the receiving bracket 80 extend away from and substantially perpendicular to second member face 10b of central bracing member 10. Substantially parallel guide arms 80" extend into central opening 42c and are mounted on a carriage 82 having a plurality of pairs of wheels 84. Wheels 84 are received by and move within a vertically oriented I-beam framework 86. Receiving bracket 80 thus is movable within central opening 42c.

Figure 8C:
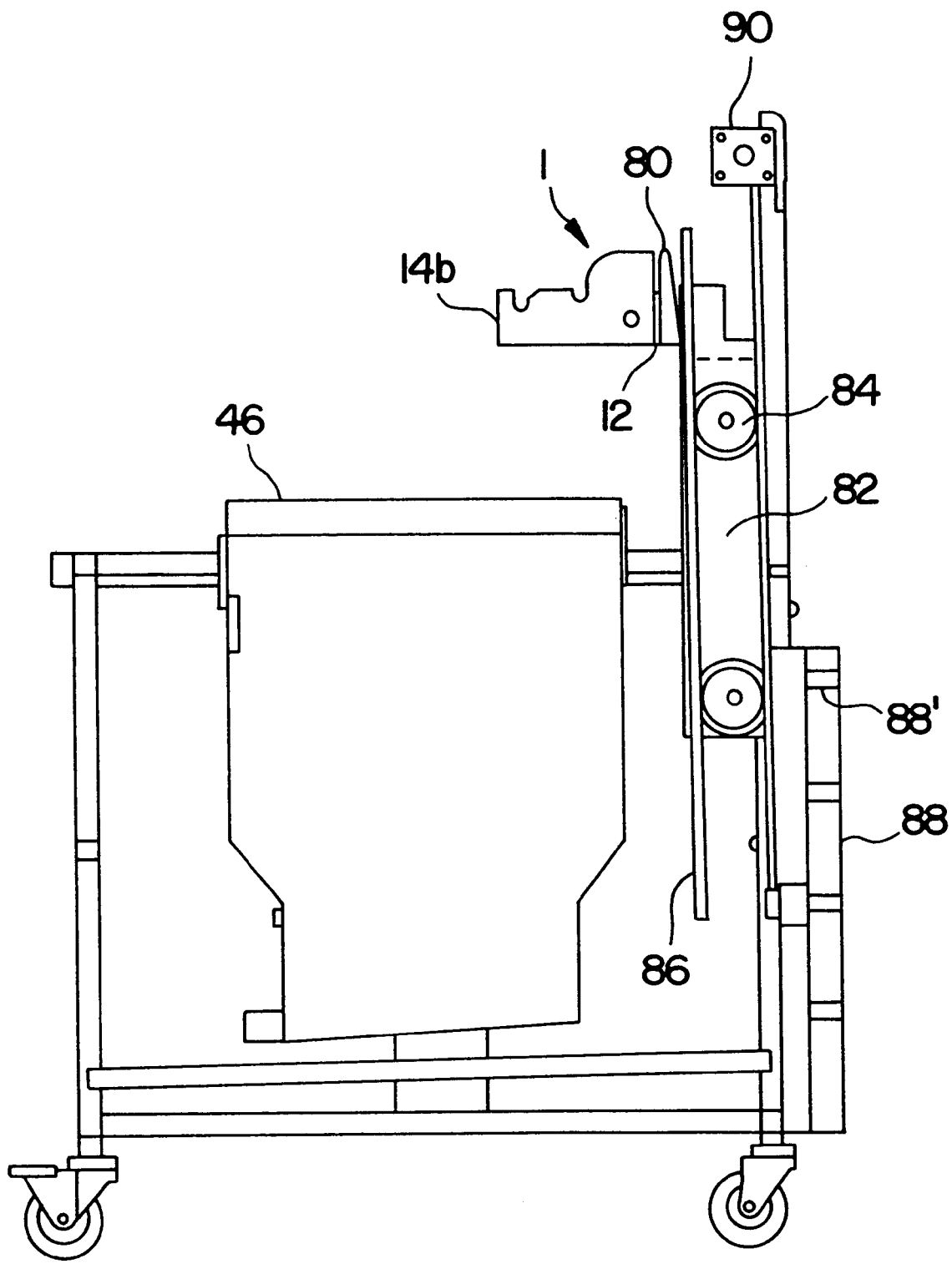
FIG. 8c is a cross-sectional view of the fryer transfer cart of FIG. 8a along Line VIIIc—VIIIc.

FIG. 8c is a cross-sectional view of fryer transfer cart 4 of FIG. 8a along Line VIIIc—VIIIc. In FIG. 8c, carriage 82 having two pairs of wheels 84 is shown within I-beam framework 86. In addition, a pulley or drum may be mounted on a pulley bracket 90. A cable or a plurality of cables (not shown) may be threaded through the pulley or across the drum and attached to carriage 82 to raise or lower receiving bracket 80 and supporting brace 1.

Lifting lid 2 and supporting brace 1 mounted on monorail 42 form a motorized assist device 4'. Lifting lid 2 is positioned over the open well of a cooking vessel 44 and is seated on an upper edge 46 of cooking vessel 44. In a pressure cooking apparatus or pressure fired flyer, lifting lid 2 may comprise a solid, substantially rectangular lid (not shown) having a gasket (not shown) for forming an air-tight seal with upper edge 44 of cooking vessel 42. Such a lifting lid for a pressure cooking apparatus or pressure fired fryer is described in U.S. Pat. No. Des. 336,007 and U.S. Pat. No. 4,930,408, the disclosures of which are incorporated herein by reference.

An operator may use handle 24 to manually raise and lower lifting lid 2 or to manually assist a motor in raising or lowering lifting lid 2 along monorail 42 or pivot lifting lid 2 vertically on supporting brace 1. Lifting lid 2 may be manually raised or lowered and supported in a raised position by a lid locking mechanism 48. Referring to FIG. 9, fryer transfer cart 4 of FIG. 8a is depicted with lifting lid 2 in a raised position. Food carrier apparatus 3 of FIG. 7 also is depicted suspended beneath lifting lid 2. As noted above, food carrier apparatus 3 has a plurality of pairs of food tray support brackets 34a and 34b, and food tray support brackets 34a and 34b are adapted to receive a plurality of food product carrier trays. Thus, by raising or lowering lifting lid 2, food carrier apparatus 3 may be removed from or submerged in a cooking medium in cooking vessel 44.

Figure 8D:
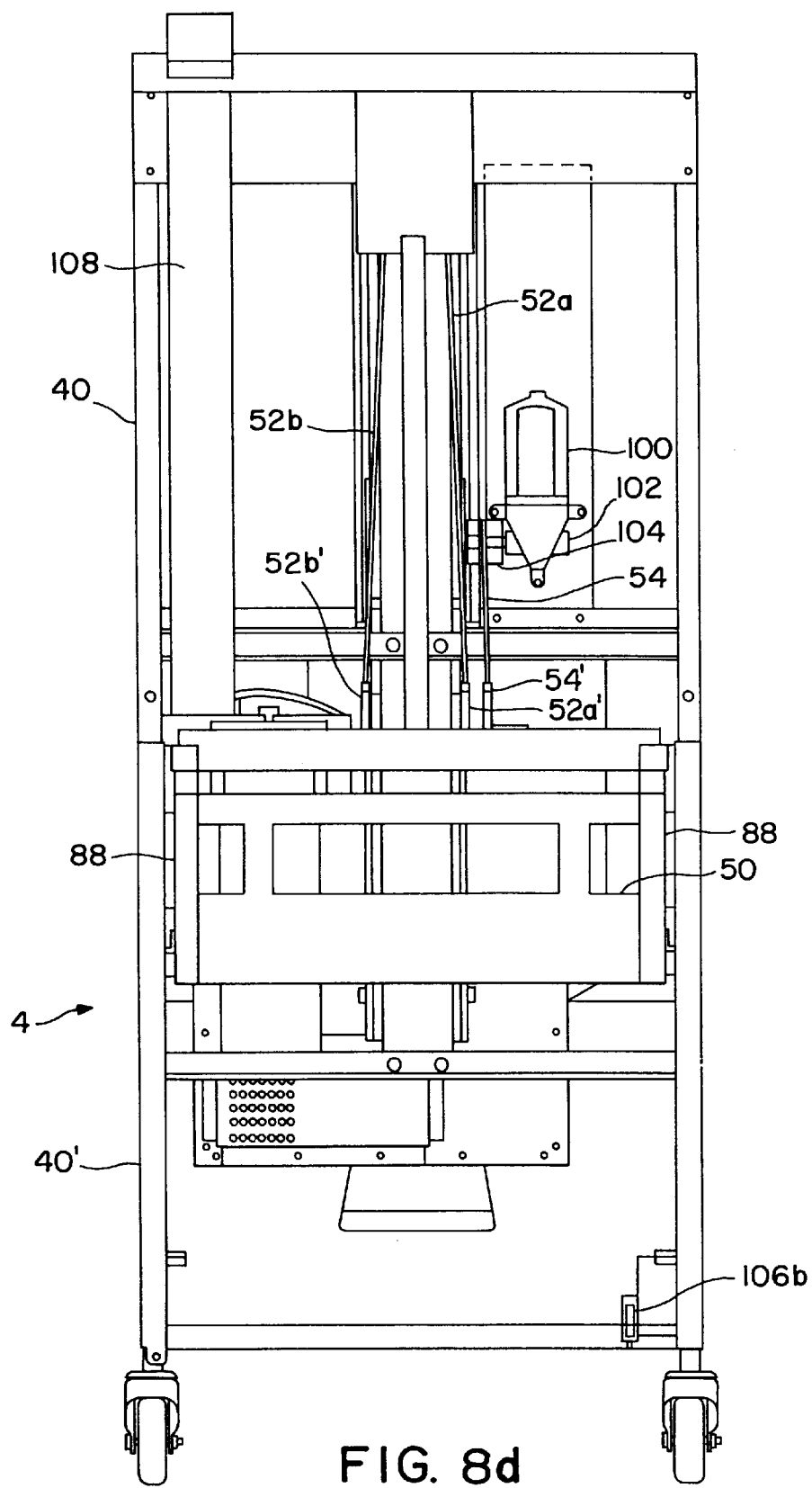

Motor assist device 4' of FIGS. 8a–e and 9 may include a manual, automatic, or manually assisted driving assembly. For example, referring again to FIGS. 8b–8d, a manual driving assembly may include a counterbalance weight 50 which is mounted in a pair of counterweight guides 88 and weighs more than lifting lid 2, supporting brace 1, and a food carrier apparatus, such as that depicted in FIG. 7, carrying a quantity of food dependent on the size of the food products and the capacity of the food carrier apparatus. Referring to FIG. 8d, counterbalance weight 50 may be joined to carriage 82 by means of at least a pair of cables, for example, a primary counterweight cable 52a and a secondary cable 52b. Primary counterweight cable 52a may be shorter than secondary counterweight cable 52b, such that primary counterweight cable 52a bears the weight of counterweight 50. Thus, if primary counterweight cable 52a (or its cable connection point 52a' to counterweight 50 or its cable connection point (not shown) to carriage 82) fails, secondary cable 52b will bear the weight of counterweight 50. Therefore, in the event of failure, secondary counterweight cable 52b will prevent lifting lid 2 from suddenly dropping on to upper edge 46 of cooking vessel 44. Further, lifting lid 2 may be raised using secondary counterweight cable 52b after the failure of primary counterweight cable 52a.

Figure 10:
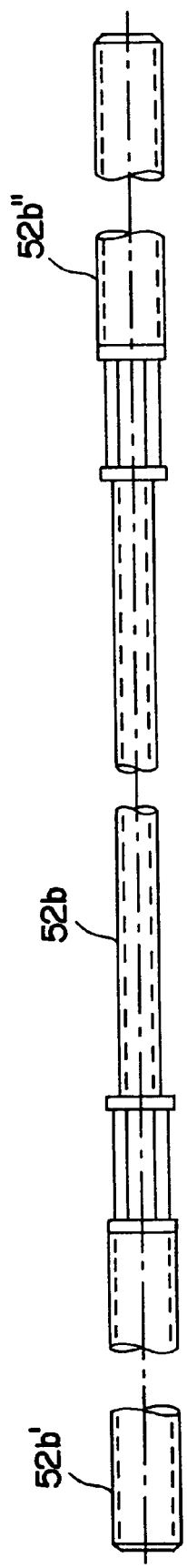
FIG. 10 depicts a cable suitable for use as the primary or secondary counterweight cable or as the lifting cable.
Figure 11:
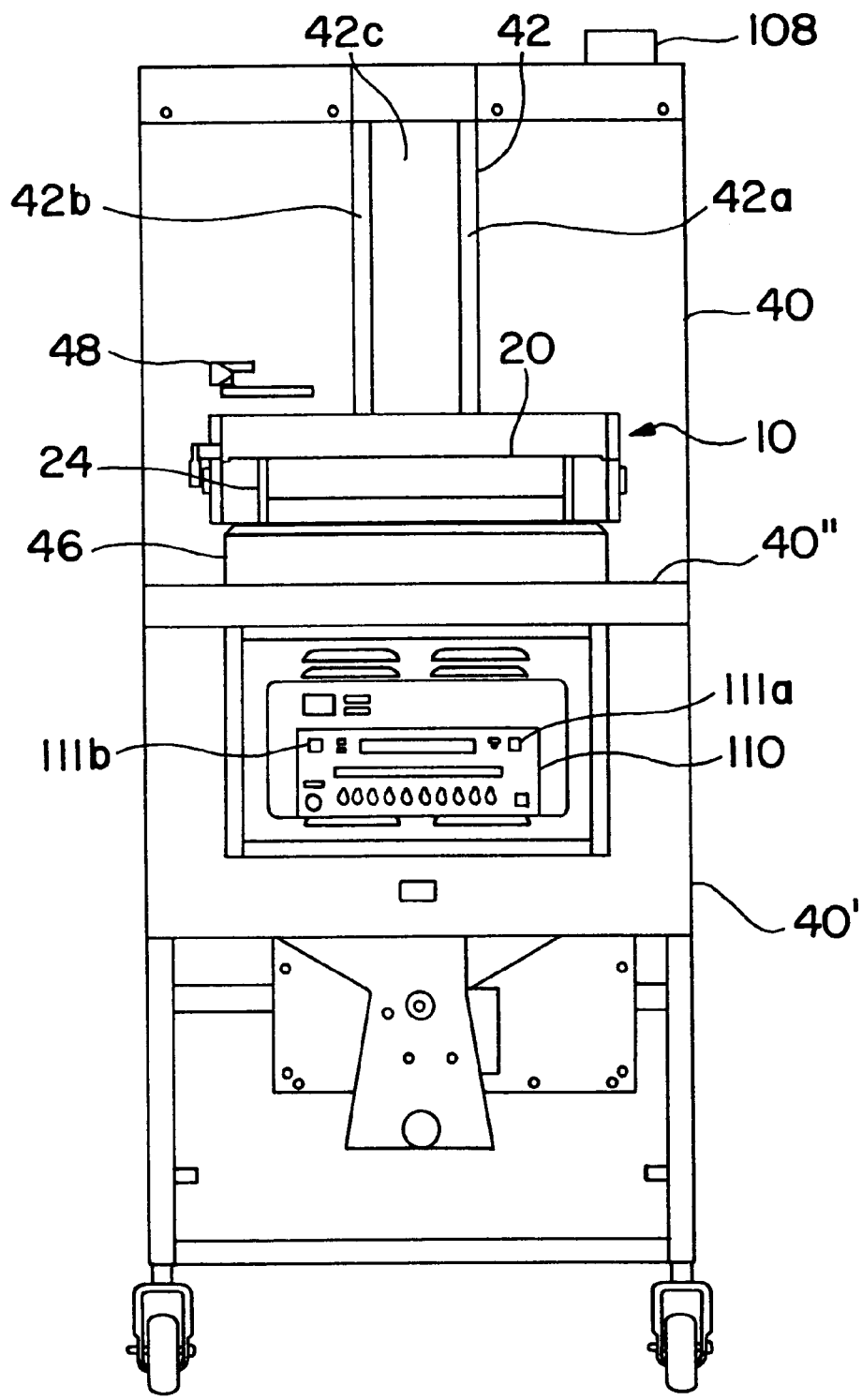

Referring to FIG. 10, a suitable cable for primary and secondary counterweight cable 52a and 52b, respectively, is 7×19 strand galvanized steel aircraft cable. Preferably this cable is equipped with a natural nylon coating. The nylon coating is designed to operate in a temperature range of about −40° F. to about 200° F. (−40° C. to 93.3° C.). The bare cable diameter is about 0.125 inches (0.318 cm) and has a coated cable diameter of about 0.187 inches (0.475 cm). The cable has a breaking strength of about 2000 lbs (910 kg). Similarly, the cable connection points may be formed from double crimped, zinc plated 12C14 steel. The pull strength of these connectors is greater than about 1310 lbs (595 kg). Suitable cables and connectors are available commercially from Richland Controls, Inc. of Lexington, Ohio, U.S.A., and Cable Manufacturing and Assembly Co. of Moberly, Mo. U.S.A.

Counterbalance weight 50 may move within a counterbalance guide 88. Counterbalance guide 88 may be equipped with a plurality of braking tabs 88', such that if one of the cables fails the counterbalance weight will fall against and be caught by at least one of braking tabs 88'. In addition, lifting lid 2 may then be positioned at various heights by means of a lid locking mechanism 48 depicted in FIGS. 8a and 9.

Figure 8E:
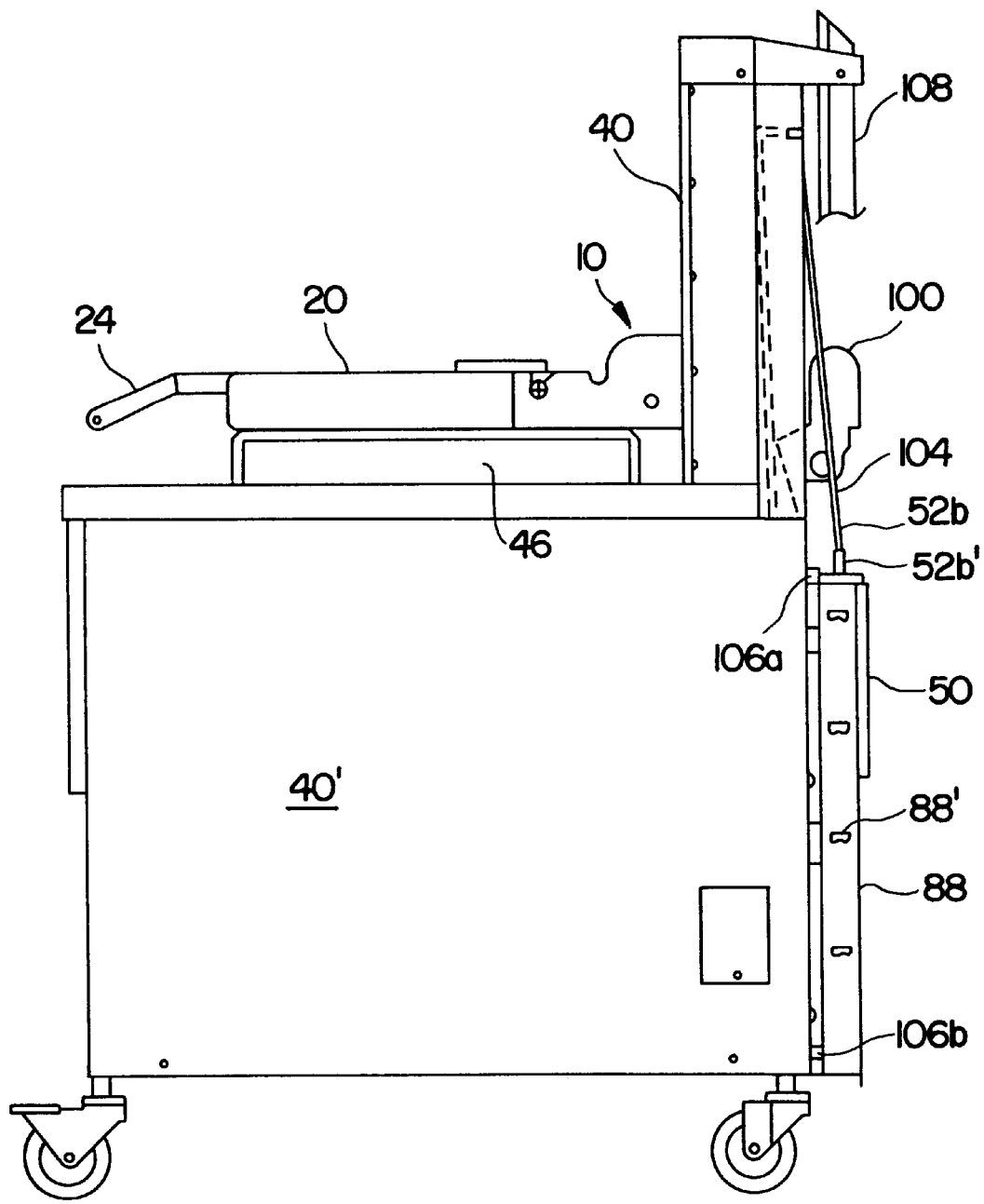

Referring to FIGS. 8d and 8e, a gear motor 100, e.g., an electric motor, may be mounted on a support bracket 102 opposite a combustion gas flue 108 and attached to counterbalance weight 50 by a lifting cable 54. Substantially parallel guide arms 80" of the receiving bracket 80 extend into central opening 42c and are secured to carriage 82. In this embodiment of motor assist device 4', lifting cable 54 is attached to a cable drum 104, and cable drum 104 is driven by motor 100. Lifting cable 54 may be made from the same cable material that is suitable for primary and secondary counterweight cables 52a and 52b, respectively. For example, referring to FIG. 10, about 30 inches (76.2 cm) of cable may be used for lifting cable 54. A connector 54' connects lifting cable 54 to counterweight 50. However, the connector is preferably removed from the end of the cable that is to be connected to cable drum 104. The connector-less end of the cable may be secured to the hub of cable drum 104 by means of a bolt, e.g., a ¼–20 bolt, and a clamp. Lifting cable 54 is attached to cable drum 104, such that motor 100 is operable in opposite directions to wind and unwind lifting cable 54 on cable drum 104 to lower and raise carriage 82, respectively.

A suitable electric motor is the Dayton Right-Angle AC/DC Gear Motor (PN 2Z798), which is commercially available from W.W Grainger, Inc. of Dayton, Ohio, U.S.A. This motor operates from a 115 volt AC/DC power source and has the following specifications:

TABLE I

| | | Electric Motor Specifications | | | | | |
|---|---|---|---|---|---|---|---|
| Nominal Full Load Speed (RPM) | No Load Speed (RPM) | Full Load Continuous Torque (inch-lbs) | Ratio | External Shaft | Shaft Ht. | HP | Full Load Amps |
| 6.7 | 15 | 162 (187 cm/kg) | 745:1 | Single | 2⅝ inches (6.67 cm) | 1/15 | 1.3 |

Referring again to FIGS. 8d and 8e, a pair of limit switches 106a and 106b may be positioned at the upper and lower limit of movement for counterweight 50. When limit switches 106a and 106b deactivate motor 100, thus controlling the range of movement for counterweight 50. Suitable limit switches may include are commercially available from Omron Company of Chicago, Ill. U.S.A., e.g., Part No. A-20GV2-B7-K.

Electric motor 100 may be actuated by the operator to lower lifting lid 2. For example, referring to FIG. 11, a panel 110 may be provided including various control and input switches to provide input and information to a processor (not shown). Panel 110 may enable the operator to actuate motor 100 and cable drum 104 in the desired direction to wind or unwind lifting cable 54. As noted above, the motor assist device may further comprise a control device including a timer (not shown) and at least a pair of motor activating control switches 111a and 111b.

Motor 100 is activated to wind the lifting cable and thereby lower the lifting lid when the pair of control switches 111a and 111b are depressed simultaneously for a predetermined period, e.g., about 10 seconds, measured by the timer. The control device may further include a lifting lid position sensor, e.g., a pressure sensor or a photoelectric cell; a processor, e.g., a microprocessor; means for providing information to the processor, e.g., a keyboard or a push button panel; and a data storage means, such as an electromagnetic memory storage device or chip, for storing product identities and cooking times for a plurality of food products. When a product identity is provided to the processor, the processor retrieves a cooking time for the product and activates the timer. Each product to be cooked, e.g., french fries, fish sticks, chicken, and the like, may be assigned an identifying code. Cooking parameters may be stored on the data storage means and retrieved in response to the input of the product identifying code. When the lifting lid position sensor indicates that the lifting lid is down and when the timer determines that the cooking time is complete, the processor activates the motor to unwind the lifting cable and thereby raise the lifting lid.

The invention will be further clarified by a consideration of the following example, which is intended to be purely exemplary of the use of the invention. An operator may load food products into a wire basket suspended beneath lifting lid 2 or onto trays which may be placed in tray carrier 3 that is suspended beneath lifting lid 2. The operator may then enter the identifying code for the type of food to be cooked and depress control switches 111a and 111b, simultaneously, and holds them for about ten (10) seconds or until the lifting lid begins to lower. As a resulted of this arrangement, in order for the operator to activate motor 100, it is required that both hands be used throughout the activation of motor 100. Thus, the operator's hands will kept clear of lifting lid 2 while lifting lid 2 is lowered into position.

By depressing control switches 111a and 111b, the operator activates motor 100 and causes cable drum 104 to wind cable 54, thereby, lifting counterweight 50, alleviating the weight of counterweight 50, and allowing lifting lid 2 to descend. Lifting lid 2 will automatically stop when it comes to rest on upper edge 46 of cooking vessel 44. The cooking cycle may start automatically, once the control device detects that lifting lid 2 is in the down position.

When the food product parameters, e.g., cooking period, have been satisfied for the identified food product, an alarm or signal may sound and the lid will automatically raise from upper edge 46 of cooking vessel 44. The alarm or signal may be manually shut off or may shut off automatically when the lifting lid reaches its fully raised position. In order to raise lifting lid 2, motor 100 is again activated, but cable drum 104 is rotated to unwind lifting cable 54, thereby allowing the weight of counterweight 50 to raise lifting lid 2. The operator may then remove the food products from a wire basket suspended below lifting lid 2 or to remove trays of food products from carrier tray 3 suspended below lifting lid 2.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A motorized assisted device for raising and lowering a lifting lid, comprising:

a supporting brace for mounting said lifting lid, including a central bracing member, a monorail mounting bracket positioned on said central bracing member;

a monorail having a receiving bracket for receiving said monorail mounting bracket;

an I-beam framework positioned within said monorail and having a pair of U-shaped guides;

a carriage having at least a pair of wheels and mounted on said framework, such that each of said U-shaped guides receives at least one of said wheels, and to which said receiving bracket is secured;

a counterweight assembly for raising and lowering said carriage along said monorail, including a pulley mounted at a top portion of said framework, a counterweight movably mounted within in a pair of counterweight guides, and at least one counterweight cable, a first end of which is attached to said counterweight and a second end of which is attached to said carriage and which is threaded through said pulley; and an assist motor mounted on a motor support bracket positioned above said counterweight and below said pulley, including a cable drum driven by said motor and a lifting cable, a drum end of which is attached to said cable drum and a counterweight end of which is attached to said counterweight, such that said motor is operable in opposite directions to wind and unwind said lifting cable on said cable drum to raise and lower said counterweight, respectively.

2. The motorized assist device of claim 1, wherein said lifting lid is positioned over a cooking vessel.

3. The motorized assist device of claim 2, wherein said lifting lid comprises a substantially rectangular frame having a pair of pivot rods, such that said pivot rods are received by said supporting bracket.

4. The motorized assist device of claim 3, wherein said lifting lid further comprises a removably mounted food carrier apparatus, wherein said food carrier apparatus is suspended beneath said lifting lid.

5. The motorized assist device of claim 4, wherein said lifting lid further comprises a pair of supporting rails and said food carrier apparatus comprises a tray carrier having a pair of carrier tray arms for engaging said pair of supporting rails and a plurality of trays.

6. The motorized assist device of claim 1, wherein said lifting lid comprises a substantially rectangular frame and a pair of pivot rods and wherein each of said first and said second pivot arms includes a lid pivot bracket, such that said pivot rods are received by said lid pivot brackets.

7. The motorized assist device of claim 6, wherein said lifting lid further comprises a removably mounted food carrier apparatus, wherein said food carrier apparatus is suspended beneath said lifting lid.

8. The motorized assist device of claim 7, wherein said lifting lid further comprises a pair of supporting rails and said food carrier apparatus comprises a tray carrier having a pair of carrier tray arms for engaging said pair of supporting rails and a plurality of trays.

9. The motorized assist device of claim 1, further comprising a control device including a timer and a pair of limit switches, wherein said motor is activated to wind said lifting cable and thereby lower said lifting lid when said pair of control switches are depressed for a predetermined period measured by said timer.

10. The motorized assist device of claim 9, wherein said control device includes a lifting lid position sensor, a processor, means for providing information to said processor, and a data storage means for storing cooking times for a plurality of food products, such that when a product identity is provided to said processor, said processor retrieves a cooking time for said product and activates said timer when said lifting lid position sensor indicates that said lifting lid is down and when said timer determines that said cooking time is complete, said processor activates said motor to unwind said lifting cable and thereby raise said lifting lid.

11. The motorized assist device of claim 1, wherein said counterweight assembly has a primary and a secondary counterweight cable, such that said primary counterweight cable is shorter than said secondary counterweight cable and said primary counterweight cable bears the weight of said counterweight.

* * * * *